United States Patent
Parent et al.

(10) Patent No.: US 7,307,402 B2
(45) Date of Patent: Dec. 11, 2007

(54) METHOD OF CHARGING ALKALI METAL POLYMER BATTERIES

(75) Inventors: Michel Parent, St-Jean-Sur-Richelieu (CA); Philippe Gagnon, Boucherville (CA); Jean-Pierre Vaillancourt, Boucherville (CA)

(73) Assignee: Avestor Limited Partnership, Boucherville (CA)

( * ) Notice: Subject to any disclaimer, the term of this patent is extended or adjusted under 35 U.S.C. 154(b) by 0 days.

(21) Appl. No.: 10/893,311

(22) Filed: Jul. 19, 2004

(65) Prior Publication Data

US 2006/0012335 A1    Jan. 19, 2006

(51) Int. Cl.
H02J 7/00    (2006.01)

(52) U.S. Cl. .................. 320/118; 320/119; 320/124
(58) Field of Classification Search ............. 320/116, 320/118, 119, 120, 124
See application file for complete search history.

(56) References Cited

U.S. PATENT DOCUMENTS

| | | | | |
|---|---|---|---|---|
| 3,930,192 | A * | 12/1975 | Dinkler ..................... | 320/119 |
| 4,045,721 | A * | 8/1977 | Swain ...................... | 320/137 |
| 4,128,798 | A * | 12/1978 | Takei ....................... | 320/140 |
| 4,238,721 | A * | 12/1980 | DeLuca et al. ............ | 320/122 |
| 5,952,815 | A | 9/1999 | Rouillard et al. ........ | 320/116 |
| 6,075,339 | A * | 6/2000 | Reipur et al. ............. | 320/110 |
| 6,121,751 | A * | 9/2000 | Merritt .................... | 320/116 |
| 6,181,106 | B1 * | 1/2001 | Finger ..................... | 320/124 |
| 6,211,650 | B1 * | 4/2001 | Mumaw et al. ........... | 320/122 |
| 6,271,646 | B1 * | 8/2001 | Evers et al. .............. | 320/122 |
| 6,285,161 | B1 * | 9/2001 | Popescu .................. | 320/118 |
| 6,700,300 | B2 * | 3/2004 | Inoue et al. .............. | 310/313 A |
| 6,700,350 | B2 * | 3/2004 | Formenti et al. .......... | 320/119 |
| 6,838,208 | B2 * | 1/2005 | DeCrosta, Jr. ............ | 429/105 |
| 2002/0055037 | A1 * | 5/2002 | Rhoten ..................... | 429/136 |
| 2003/0151389 | A1 * | 8/2003 | Cummings ................ | 320/122 |
| 2004/0189250 | A1 * | 9/2004 | Nishida .................... | 320/116 |
| 2004/0247969 | A1 * | 12/2004 | Faris et al. ................ | 429/27 |

FOREIGN PATENT DOCUMENTS

| | | |
|---|---|---|
| EP | 0 762 593 A3 | 8/1998 |
| EP | 0 998 779 | 2/1999 |
| EP | 1 455 195 A1 | 9/2004 |
| JP | 2003217681 A | 7/2003 |
| WO | WO 99/50928 | 10/1999 |
| WO | WO 01/05014 A1 | 1/2001 |
| WO | PCT/CA2005/001016 | 10/2005 |

* cited by examiner

*Primary Examiner*—Karl Easthom
*Assistant Examiner*—Samuel Berhanu
(74) *Attorney, Agent, or Firm*—Osler, Hoskin & Harcourt LLP

(57) ABSTRACT

A method of charging an electrochemical generator having a plurality of electrochemical cells. The method includes the step of charging the plurality of electrochemical cells such that the total voltage of the generator reaches a predetermined voltage level, followed by the steps of selecting a particular electrochemical cell and charging the particular electrochemical cell to its respective maximum voltage, such that the cathode(s) of the particular electrochemical cell is(are) restored to a fully-charged state. Once it has been restored to its fully-charged state, the particular electrochemical cell is allowed to discharge itself down to a nominal voltage. Each of the plurality of electrochemical cells of the generator is selected and charged to its respective maximum voltage in turn, according to a predetermined selection sequence.

9 Claims, 4 Drawing Sheets

METHOD OF CHARGING ALKALI METAL POLYMER BATTERIES

FIELD OF THE INVENTION

The present invention relates generally to a method of charging alkali metal polymer batteries and, more specifically, to a method and process for charging alkali metal polymer batteries that reduces the capacity fade of such batteries.

BACKGROUND OF THE INVENTION

Rechargeable alkali metal polymer batteries manufactured from laminates of solid polymer electrolytes and sheet-like anodes and cathodes display many advantages over conventional liquid electrolyte batteries. These advantages include having a lower overall battery weight, having a high power density, having a high specific energy and having a longer service life, as well as being environmentally friendly since the danger of spilling toxic liquid into the environment is eliminated.

The components of solid polymer electrochemical cells include positive electrodes, negative electrodes and separators capable of permitting ionic conductivity, such as solid polymer electrolytes, sandwiched between each anode and cathode pair. The negative electrodes, or anodes, and the positive electrodes, or cathodes, are made of material capable of reversibly releasing and occluding alkali metal ions.

The cathodes are typically formed of a mixture of active material capable of occluding and releasing lithium, such as transitional metal oxides or transitional metal phosphates, an electronically conductive filler, usually carbon or graphite or combinations thereof, and an ionically conductive polymer binder. Cathode materials are usually paste-like materials that require a current collector, usually a thin sheet of electrically conductive material, such as aluminum foil.

The anodes are typically made of light-weight metal foils, such as alkali metals and alloys. Typically, anodes are made of lithium metal, lithium oxide, lithium-aluminum alloys and the like. Alternatively, the anodes may be made of composite paste-like material, such as carbon-based intercalation compounds in a polymer binder, in which case the anodes also require a current collector support, for example a thin sheet of copper.

During discharge, the electrochemical reaction involves the oxidation of the lithium metal anode and the reduction of the transitional metal oxide cathode. During discharge, the lithium cations, Li+, travel through the ionically conductive polymer separator and are inserted into the interstitial sites of the transitional metal oxide cathode, while the electrons provided by anode oxidation generate electrical current. When recharging the lithium electrochemical cells, electrical current is provided to the anode with the effect of removing the lithium cations, Li+, from the interstitial sites of the transitional metal oxide cathode, returning them to the lithium anode. In theory, the electrochemical reaction is completely reversible; however, in practice, it may not be possible to restore the electrochemical cells to their original state through a normal charge, because the voltage limits of the application load to which the electrochemical cells are connected may prevent a full charge. When the electrochemical cells are not fully recharged or restored, some of the inserted lithium cations remain within the interstitial sites of the transitional metal oxide cathode, causing an excessive number of charge/discharge cycles. As such, the capacity of each electrochemical cell may be prematurely reduced by the remaining lithium cations within the transitional metal oxide cathode. Because of the voltage limit of the application load, the electrochemical battery may suffer an artificially accelerated capacity fade, which may reduce its useful life.

Thus, there exists a need for a method and process of charging an alkali metal electrochemical generator, adapted to circumvent voltage limits imposed by application loads to which the generator is connected, such that each electrochemical cell of the electrochemical generator may be restored to its original chemical state.

SUMMARY OF THE INVENTION

It is therefore an object of the present invention to provide a method of charging an alkali metal electrochemical generator whereby each electrochemical cell of the generator is restored to its original chemical state.

It is another object of the present invention to provide an electrochemical generator having at least two electrochemical cells and an electronic control system, the electronic control system being operative to charge the electrochemical generator such that each electrochemical cell of the generator is restored to its original chemical state.

As embodied and broadly described, the invention provides a method of charging an electrochemical generator having a plurality of electrochemical cells, each electrochemical cell including at least one cathode, at least one anode and at least one electrolyte separator therebetween, the electrochemical generator being characterized by a total voltage, each electrochemical cell being associated with a respective maximum voltage, said method comprising:

a) charging the plurality of electrochemical cells such that the total voltage of the electrochemical generator reaches a predetermined voltage level;

b) selecting a particular electrochemical cell of the electrochemical generator; and c) charging the particular electrochemical cell to its respective maximum voltage, thereby restoring its at least one cathode to a fully-charged state.

In a non-limiting example of implementation of the present invention, once the particular electrochemical cell has been restored to the fully-charged state, the particular electrochemical cell is allowed to discharge itself, or is controllably discharged, down to a nominal voltage. Each of the plurality of electrochemical cells of the generator is selected and charged to its maximum voltage in turn, according to a predetermined selection sequence.

Advantageously, the sum of the voltages of the plurality of electrochemical cells of the electrochemical generator does not exceed a preset voltage limit of a load application connected to the generator.

BRIEF DESCRIPTION OF THE DRAWINGS

The invention will be better understood and other advantages will appear by means of the following description and the following drawings in which.

DETAILED DESCRIPTION

For the sake of clarity, the present invention will be described in the context of a specific, non-limiting embodiment of an electrochemical generator having a plurality of electrochemical cells. However, the method and process described herein may be used in various different embodiments of electrochemical generators, without departing from the scope of the present invention.

Figure 1:
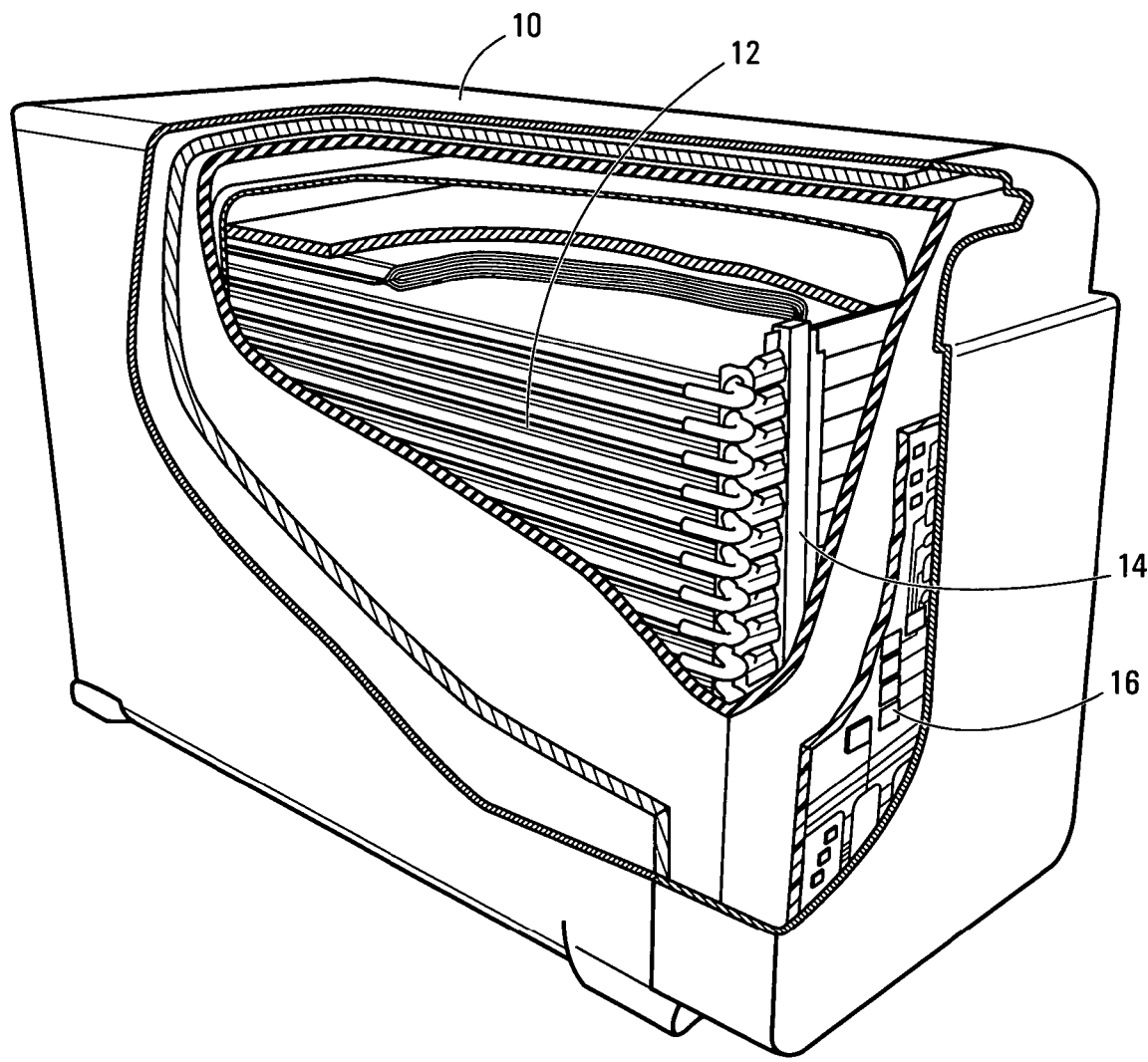
FIG. 1 is a perspective view of an example of an electrochemical generator.

FIG. 1 illustrates a lithium metal polymer generator 10, with a cut-away portion showing its internal components. In this specific example, the generator 10 includes a plurality of electrochemical cells 12 stacked one against the other and connected in series through a bus bar 14. Bus bar 14 is connected to an electronic control board 16 that controls the charge and discharge mode of the electrochemical cells 12 and monitors various parameters of the generator 10.

Figure 2:
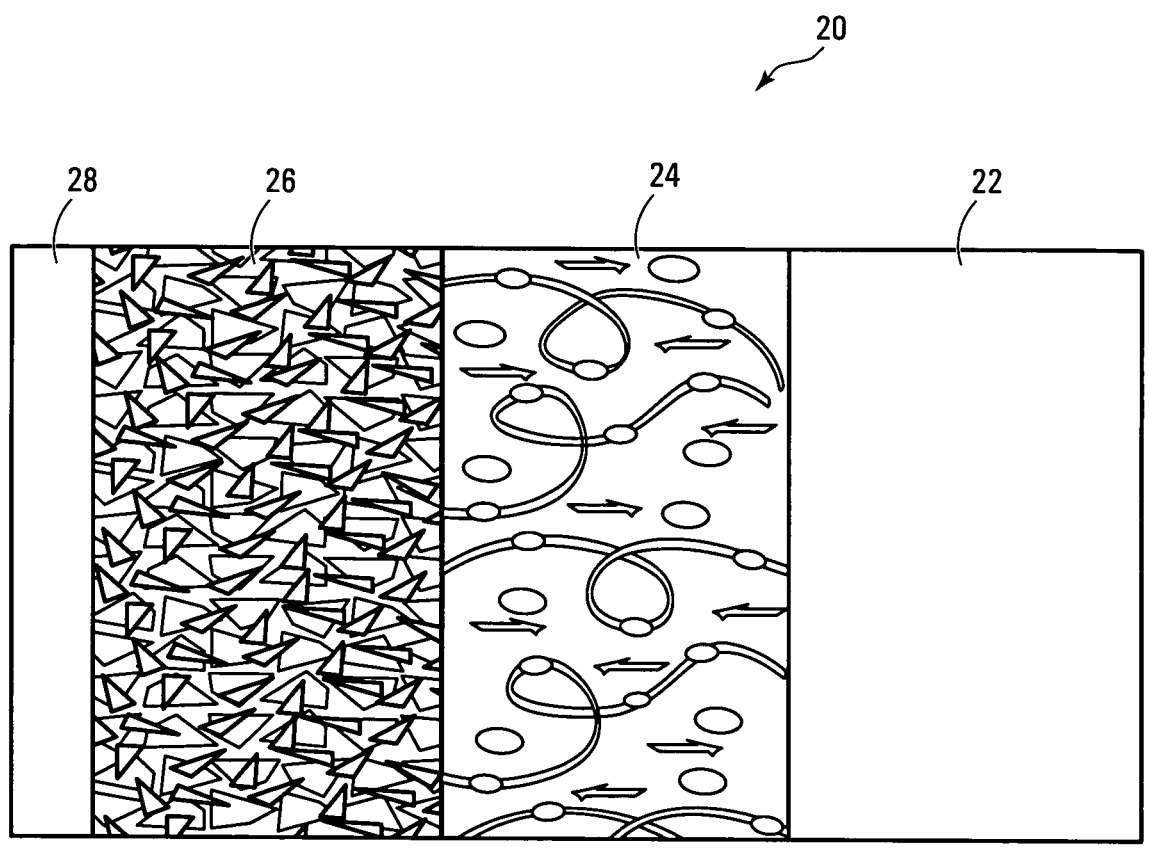
FIG. 2 is a schematic view of a typical electrochemical cell laminate.

Each electrochemical cell 12 consists of a multi layer assembly of laminates 20, illustrated schematically in FIG. 2. Each laminate 20 comprises a metallic lithium foil anode 22 that acts as a lithium source, a solid polymer electrolyte separator 24 that acts as a lithium ion carrier, and a transitional metal oxide cathode 26. The cathode 26 is made of a compound of vanadium oxide and polymer binder, and is adapted to reversibly intercalate lithium ions. The cathode 26 is supported by a current collector 28 that is operative to electrically connect the cathode 26 to the bus bar 14 and to the application load (not shown).

Specifically, lithiated vanadium oxide ($Li_{1+x}V_3O_8$ where $0.2 \leq x \leq 2.8$) is an attractive cathode insertion material because its lattice structure is relatively stable against lithium insertion and extraction and offers two-dimensional crystallographic interstitial sites (tetrahedral sites and octahedral sites). During discharge, lithium intercalation or lithium insertion, the lithium cations Li+ travel through the polymer electrolyte 24 and are inserted into the interstitial crystallographic sites of the $Li_{1+x}V_3O_8$ lattice in two single-phase reaction processes. First, the lithium cations Li+ are inserted into the tetrahedral sites until these are fully occupied, such that the composition reaches $Li_{2.0}V_3O_8$. As discharge or insertion continues, lithium ions are inserted into the octahedral sites of the $Li_{2.0}V_3O_8$ lattice until these sites are fully occupied, such that the composition reaches $Li_{3.7}V_3O_8$. If discharge or insertion continues, the lithium ions located in the octahedral sites are displaced by further incoming lithium ions into neighboring octahedral sites, which displacement is accompanied by a modification of the oxygen ion arrays of $V_3O_8$ towards a cubic close packing, until the composition reaches $Li_{4.0}V_3O_8$. The mechanism of lithium insertion into an $Li_{1+x}V_3O_8$ insertion electrode is explained in further detail in a scientific paper entitled "Structural characterization of $Li_{1+x}V_3O_8$ insertion electrodes by single-crystal X-ray diffraction", published in Solid State Ionics, Vol. 62, 1993, PP 297-307, which is hereby incorporated by reference.

During recharging, deintercalation or withdrawal of lithium ions from the interstitial sites of the lithiated vanadium oxide, it is generally assumed that the reverse process occurs; however, structural characterization of the deintercalation process of $Li_{1+x}V_3O_8$ remains incomplete. Nevertheless, it has been observed that if the electrochemical cells 12 are not recharged to their full charge voltage after every discharge, the capacity of the electrochemical cells 12 fades more rapidly than when they are recharged to their full charge voltage after every discharge. The useful life of the generator 10 may be substantially shortened if the load application to which it is connected has a voltage limiter that prevents the full recharge of the electrochemical cells 12 of generator 10.

In order to illustrate the problem, assume that generator 10 has twelve electrochemical cells 12 connected in series, each electrochemical cell 12 having a nominal voltage of 3.0 Volts for a nominal generator voltage of 36 Volts. In fact, each electrochemical cell 12 has a maximum voltage of 3.2 Volts, for a maximum generator voltage of 38.4 Volts. If the load application voltage limit is set at 36 Volts, it is not possible to recharge each electrochemical cell 12 to its maximum voltage of 3.2 Volts. As previously mentioned, if each electrochemical cell 12 is not recharged to its full charge or maximum charge voltage, the lithium ions inserted in the interstitial sites of the $LiV_3O_8$ cathode during discharge will not all be returned to the lithium anode during recharging. As such, the $LiV_3O_8$ cathode will not be restored to its original state, with the negative effect of potentially reducing the useful life of the generator 10. Other cathode materials such as, for example, other transitional metal oxides or phosphate-based materials may also benefit from a restoration to their fully charge states to stabilize their structure.

Figure 3:
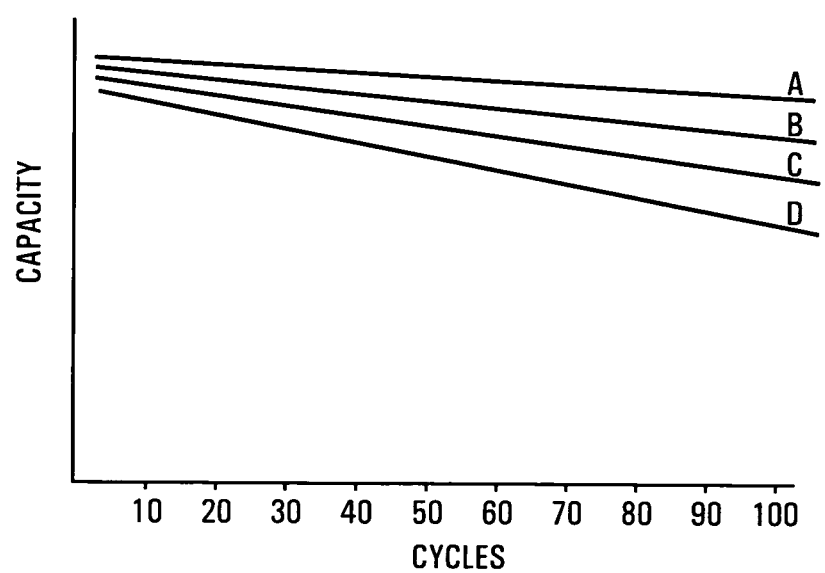
FIG. 3 is a graph illustrating the capacity fade of electrochemical cells of different recharge voltage.

FIG. 3 is a graph illustrating the evolution of the capacity of an electrochemical cell 12 over 100 cycles for four different recharge voltages, where a cycle is a full discharge followed by a recharge. Plotted line A represents the evolution of the capacity of an electrochemical cell 12 when it is always recharged to its maximum voltage of 3.2 Volts and therefore represents the nominal or expected capacity fade of the electrochemical cell 12. Plotted line B represents the evolution of the capacity when an electrochemical cell 12 is always recharged to a voltage of 3.1 Volts. It can be seen that with a recharge to 3.1 Volts, the slope of plotted line B is steeper than that of plotted line A, the capacity of electrochemical cell 12 fading more rapidly. Plotted line C represents the evolution of the capacity when electrochemical cell 12 is always recharged to a voltage of 3.0 Volts. Again we can observe an increase in capacity fade relative to recharges to 3.1 or 3.2 Volts. Plotted line D represents the evolution of the capacity when electrochemical cell 12 is always recharged to a voltage of 2.9 Volts and shows a further increase of capacity fade over 100 cycles. These plotted experimental data illustrate the importance of recharging each electrochemical cell 12 to its fully charged state, in order to maintain an acceptable or nominal capacity fade and meet the expected useful life of the generator 10.

In the situation where the application load voltage limit prevents a full charge of the generator 10, the inventors have devised a method of recharging generator 10 such that each electrochemical cell 12 is recharged to its maximum voltage. This method includes the step of recharging all electrochemical cells 12 to a predetermined total voltage of the generator 10 which is at or below the voltage limit of the load application, followed by the step of individually and sequentially charging each electrochemical cell 12 to its maximum voltage. Each electrochemical cell 12 that has been charged to its maximum voltage is thereafter allowed to return to a lower voltage in order to avoid reaching the total voltage of the generator 10, which would exceed the voltage limit of the load application.

In a specific, non-limiting example of implementation of the present invention, the partial discharge of each electrochemical cell 12 that has been charged to its maximum voltage occurs naturally, since each fully charged cell 12 tends to balance its voltage with neighboring electrochemical cells 12. The partial discharge also occurs rapidly, since the maximum voltage of an electrochemical cell 12 is in the steepest portion of its discharge curve, which means that its voltage will drop rapidly. Alternatively, each electrochemical cell 12 that has been recharged to its maximum voltage may be discharged into the load application or into the other cells 12, such that the sum of the voltages of all electrochemical cells 12 is kept under the threshold voltage limit of the load application. In either case, each electrochemical cell 12 is fully recharged and restored at least temporarily to its initial state, such that its capacity will follow the evolution of the nominal capacity fade illustrated by plotted line A in FIG. 3.

In a specific example, assume that the voltage limit of the load application to which generator 10 is connected is 36 Volts and that the generator 10 includes twelve electrochemical cells 12 connected in series. Each electrochemical cell 12 has a maximum voltage of 3.2 Volts, for a maximum generator voltage of 38.4 Volts. After a discharge, generator 10 would be recharged to 35.76 Volts, which means that each of the twelve electrochemical cells 12 would be recharged to a predetermined value of 2.98 Volts. Once the electronic control board 16 detects that each electrochemical cell 12 has been charged to 2.98 Volts, the electronic control board 16 initiates the sequential charging mode. During the sequential charging, one electrochemical cell 12 is selected and a charging current is fed into this selected electrochemical cell 12, until the selected electrochemical cell 12 reaches its maximum voltage of 3.2 Volts. The voltage of the other cells 12 remains at approximately 2.98 Volts, thereby ensuring that the sum of the voltages of all twelve cells does not exceed the application load voltage limit of 36 Volts: (11× 2.98 Volts)+3.2 Volts=35.98 Volts<36 Volts.

Note that generator 10 may have more or less than 12 electrochemical cells, without departing from the scope of the present invention. In fact, generator 10 may include any number of electrochemical cells, for example 18, 24, 30, 40, etc.

When the selected electrochemical cell 12 reaches its maximum voltage of 3.2 Volts, the electronic control board 16 cuts the charging current and allows the now fully charged selected electrochemical cell 12 to remain charged for a predetermined, fixed relaxation period (for example 30 seconds, 60 seconds, 1 hour, etc.). Afterwards, the voltage of the selected cell 12 is allowed to drop back down to approximately 2.98 Volts. In a specific example, the fully charged selected electrochemical cell 12 is discharged into the load application or into adjacent electrochemical cells 12. Next, a second electrochemical cell 12 is selected by the electronic control board 16 and recharged to its 3.2 Volts maximum voltage, while the voltages of the other cells 12 remain at approximately 2.98 Volts. The voltage of the second selected electrochemical cell 12 is maintained at 3.2 Volts for the predetermined relaxation period, after which it is allowed to drop back down to its nominal 2.98 Volts. All twelve electrochemical cells 12 are recharged, one after the other, following the above-described steps, such that the cathodes 26 of each electrochemical cell are restored to their original state for at least a brief moment. The sequential charging mode allows to top off the voltage of each individual electrochemical cell 12 to its maximum value, such that all lithium ions inserted in the interstitial sites of the cathodes 26 are returned to the lithium anodes and the cathodes 26 are restored to their original state. The topping off of the voltage of each individual electrochemical cell 12 ensures that the capacity fade of the generator 10 is minimal and that its expected useful life is maximal.

Figure 4:
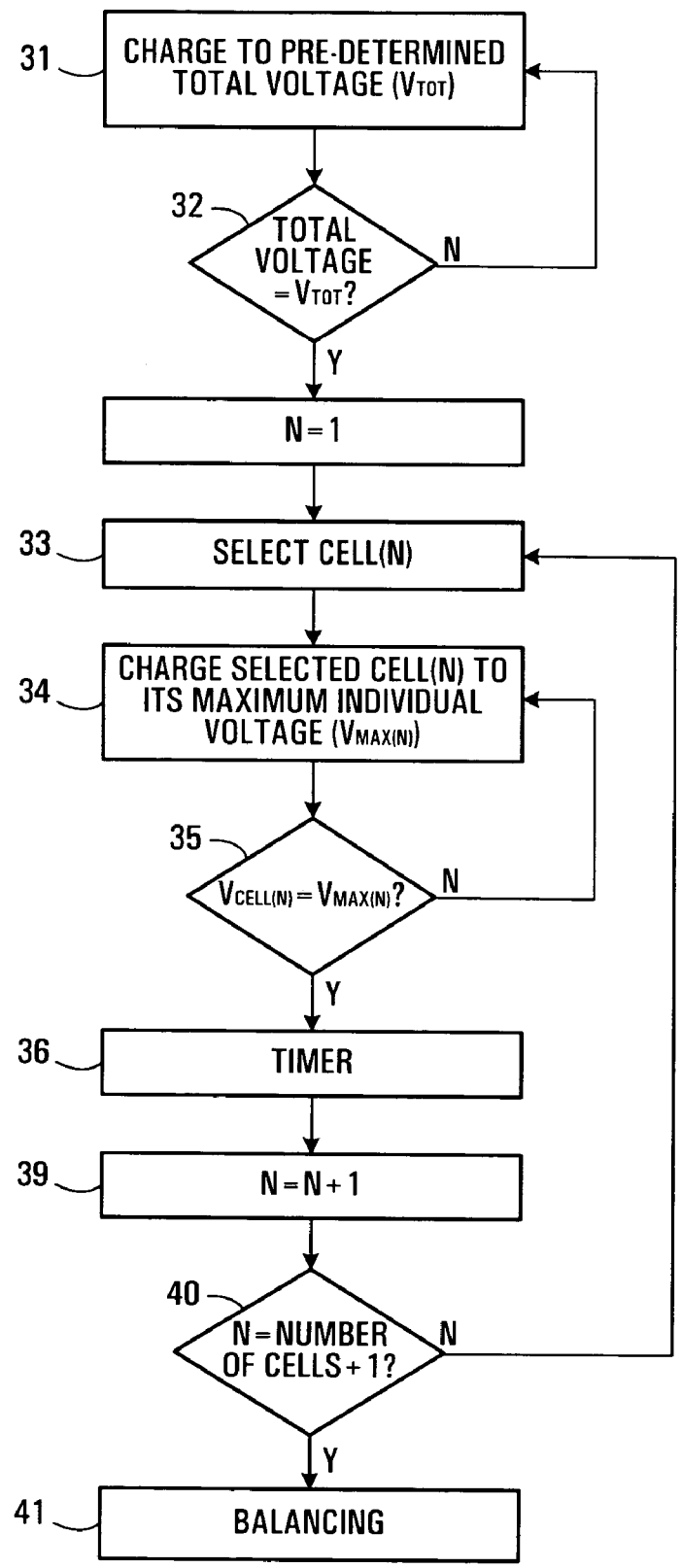
FIG. 4 is a flow chart depicting a charging method for an electrochemical generator, in accordance with an example of implementation of the present invention.

FIG. 4 is a flow chart diagram illustrating schematically an example of a logic sequence executed by the electronic control board 16 when recharging the electrochemical generator 10 after a deep discharge. The electronic control board 16 begins with a indiscriminate charge of the generator 10 to a total voltage (Vtot) of 12×2.98 Volts=35.76 Volts as an example only) with, of course, a safety trigger to ensure that none of the individual electrochemical cells 12 are overcharged above 3.2 Volts. A multitude of charging strategies for bringing generator 10 safely and efficiently to its voltage limit of 36 Volts exist and are well known to those skilled in the art, such as a constant current charge or a constant voltage charge from application load voltage. The charging may occur in short spurts of 10 or 15 seconds, for example, among other possibilities. When the total voltage of generator 10 reaches its pre-set total voltage limit of 35.76 Volts, the electronic control board 16 begins the execution of the cell topping sequence by selecting a first electrochemical cell 12, specifically cell(N) where 0<N<13.

Starting with N=1, cell(N) is charged through a constant voltage charge to its maximum individual voltage $V_{max(N)}$ of 3.2 Volts. The total voltage of generator 10 will not exceed 36 Volts when the selected cell(N) reaches its maximum voltage of $V_{max(N)}$=3.2 Volts since:

(11×2.98 Volts)+3.2 Volts=35.98 Volts<36 Volts

Thus, even with cell(N) at its maximum voltage $V_{max(N)}$ of 3.2 Volts, the summation of the voltages of all twelve cells 12 is maintained at or below 36 Volts. When selected cell(N) has reached its maximum voltage $V_{max(N)}$ of 3.2 Volts, it is maintained at 3.2 Volts for a predetermined amount of time before being allowed to discharged back to 2.98 Volts to ensure complete removal of the lithium cations Li+ from the interstitial sites of the cathodes of cell(N) and modification of the oxygen ion arrays of the insertion material to their original structure. A timer monitors the amount of time for which cell(N) is maintained at $V_{max(N)}$. When the predetermined amount of time has lapsed, the electronic control board 16 releases selected cell(N), which will then naturally return to the equilibrium voltage of approximately 2.98 Volts. The variable N is incremented by 1 and the electronic control board 16 returns to step 33 of the flowchart of FIG. 4 to select a second electrochemical cell 12 (N=2) and perform thereon the cell topping steps 34 to 39 as previously described. This logic sequence is repeated for each cell(N), from N=1 to N=12.

Depending on the voltage limit of the load application to which generator 10 is connected, the predetermined total voltage ($V_{tot}$) will vary. As well, depending on the number of electrochemical cells 12 of the generator 10, the cell topping steps will also vary accordingly.

In the above example, each time cell topping steps 34 to 39 have been performed on a cell(N), the variable N is incremented by 1. Thus, the twelve electrochemical cells 12 are selected consecutively, from cell(1) to cell(12). Note however that different selection sequences may also be implemented. For example, the selection sequence may be: cell(1), cell(12), cell(2), cell(11), cell(3), cell(10), cell(4), cell(9), etc. Alternatively, the selection sequence may be: cell(6), cell(7), cell(5), cell(8), cell(4), cell(9), cell(3), cell(10), cell(2), cell(11), cell(1), cell(12). Any such selection sequence may be implemented without departing from the scope of the present invention.

In a variant example of implementation of the present invention, when the selected cell(N) is charged to its maximum voltage $V_{max(N)}$ and the predetermined amount of time has lapsed, the electronic control board 16 proceeds with a small controlled discharge of the selected cell(N) into the application load to bring its voltage down to its nominal voltage $V_{cell(N)}=V_{target}=2.98$ Volts. Note that this energy is not lost, since it is discharged into the application load and therefore useful. When the selected cell(N) reaches the target voltage of 2.98 Volts, the electronic control board 16 selects a different electrochemical cell 12 and repeats the entire sequence of operations on the newly selected electrochemical cell 12.

In the flow chart shown in FIG. 4, when N=13, all electrochemical cells 12 have been restored to their original states and cell balancing or equalization is initiated by electronic control board 16. Cell balancing or equalization consists in bringing all twelve electrochemical cells 12 to the nominal voltage of $V_{tot}/12 \approx 3.0$ Volts.

When balancing is completed, each electrochemical cell 12 has an approximate voltage of 3.0 Volts, for a total sum of 36 Volts corresponding to the load application voltage limit. Cell balancing is described in detailed in U.S. Pat. No. 5,952,815, which is hereby incorporated by reference.

In a variant of the logic sequence shown in FIG. 4, during the initial recharging of the generator 10, the total voltage ($V_{tot}$) of generator 10 is allowed to reach the nominal voltage of 36 Volts=(12×3.0 Volts). Next, when the selected cell(N) is set to be charged to its maximum voltage of 3.2 Volts, there is an initial discharge of all of the remaining, non-selected electrochemical cells 12 by 0.2/11 Volts into the application load, thereby insuring that the summation of the voltages of all twelve electrochemical cells 12 is maintained at or below 36 Volts. When the selected cell(N) is thereafter discharged back down to 3.0 Volts, the discharge current of the selected cell(N) is applied to the remaining, non-selected electrochemical cells 12 in order to bring their voltages back up to, or near to, the nominal voltage of 3.0 Volts.

Figure 5:
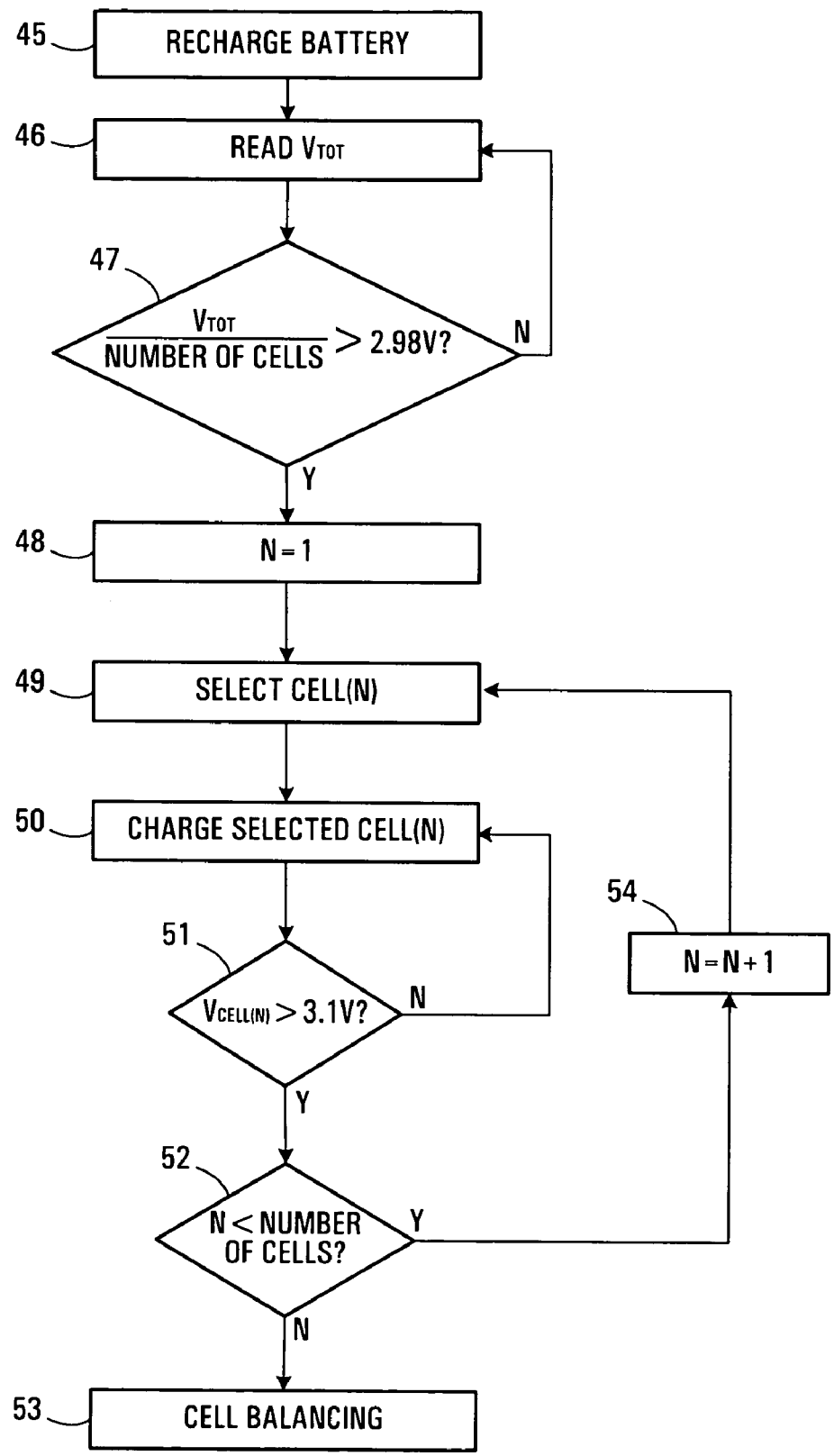
FIG. 5 is a flow chart depicting a charging method for an electrochemical generator, in accordance with a variant example of implementation of the present invention.

FIG. 5 is a flow chart diagram illustrating schematically a variant example of a logic sequence executed by the electronic control board 16 when recharging the electrochemical generator 10 after a deep discharge. In the recharge mode 45, the electronic control board 16 monitors the total battery voltage $V_{tot}$ until $V_{tot}$ divided by the number of electrochemical cells 12 exceeds 2.98 Volts. In this example, there are twelve electrochemical cells 12, such that the threshold is defined by: $V_{tot}/12>2.98$ Volts. When $V_{tot}/12>2.98$ Volts, the cell topping sequence is initiated and the electronic control board 16 selects a first electrochemical cell 12, notably cell(N) where 0<N<13. Starting with N=1, the electronic control board 16 charges the selected cell(N) until it reaches a voltage above 3.1 Volts ($V_{cell}>3.1$ Volts), at which point N is incremented by one if N<12. Next a second electrochemical cell 12 (N=2) is selected and charged to a voltage above 3.1 Volts ($V_{cell}>3.1$ Volts). The cell topping sequence is repeated for each electrochemical cell 12 until all electrochemical cells 12 have been recharged to greater than 3.1 Volts and restored to their initial states. As in the above logic sequence example, different cell selection sequences may applied without departing from the scope of the invention.

As previously mentioned, the cell topping sequence or recharging may also be useful for other cathode materials. The recharging of individual cells in an electrochemical generator comprising phosphate-based cathode materials or other transitional metal oxide cathode materials ensures that the structure of the cathode material is stabilized to its fully charged state thereby ensuring maximum useful life for the electrochemical cell. For an electrochemical generator comprising phosphate-based cathode materials or other transitional metal oxide cathode materials, the maximum voltage $V_{max(N)}$ of each individual cell may be as high as 4.0 Volts. Therefore, the predetermined total voltage of the electrochemical generator must be set accordingly for triggering the cell topping sequence.

Although the examples of implementation described above make mention of precise voltage values, it is to be understood that these values are given as examples only and vary according to the type of insertion material use in the cathode of the electrochemical cells, applications, voltage limits, etc.

Furthermore, these values are dependent on the measurement capability of the electronic control board 16, which must be taken into account when determining the threshold parameters triggering the various steps of the cell topping sequence.

Although the present invention has been described in relation to particular variations thereof, other variation and modifications are contemplated and are within the scope of the present invention. Therefore the present invention is not to be limited by the above description but is defined by the appended claims.

We claim:

1. A method of charging an electrochemical generator connected to a load application having a pre-set voltage limit, the electrochemical generator having a plurality of electrochemical cells, each electrochemical cell being characterized by a respective voltage and including at least one cathode, at least one anode and at least one electrolyte separator therebetween, the electrochemical generator being characterized by a total voltage substantially corresponding to a sum of the voltages the plurality of electrochemical cells, each electrochemical cell being chargeable to a respective maximum voltage at which each of its at least one cathode is restored to a respective original chemical state, said method comprising:
   a) charging the plurality of electrochemical cells such that the total voltage of the electrochemical generator reaches a predetermined voltage level;
   b) selecting a particular electrochemical cell of the electrochemical generator;
   c) charging the particular electrochemical cell to its respective maximum voltage, thereby restoring each of the at least one cathode of the particular electrochemical cell to its respective original state;
   d) controllably discharging the particular electrochemical cell from its respective maximum voltage to a nominal voltage that is less than its respective maximum voltage to prevent the sum of the voltages of the plurality of electrochemical cells from exceeding the pre-set voltage limit of the load application;
   e) selecting a second particular electrochemical cell of the electrochemical generator and applying steps c) through d) to the second particular electrochemical cell; and
   f) applying steps b) and d) to each of the plurality of electrochemical cells of the generator in turn, according to a selection sequence, until each electrochemical cell of the generator has been restored.

2. A method as defined in claim 1, further comprising maintaining each particular electrochemical cell at its respective maximum voltage for a predetermined period of time before discharging the particular electrochemical cell down to its respective nominal voltage.

3. A method as defined in claim 1, wherein charging of the particular electrochemical cell occurs in spurts.

4. A method as defined in claim 1, wherein the plurality of electrochemical cells of the generator are arranged in a stack, each electrochemical cell being characterized by a respective position within the stack, the selection sequence being based on the positions of the electrochemical cells within the stack.

5. A method as defined in claim 4, wherein the selection sequence is based on a random choice of positions within the stack of electrochemical cells.

6. A method as defined in claim 4, wherein the selection sequence is based on an ordered choice of positions within the stack of electrochemical cells.

7. A method as defined in claim 1, wherein the predetermined voltage level is a preset voltage limit of an application load of the electrochemical generator, said method further including the step of reducing via discharge the voltage of each of the remaining, non-selected electrochemical cells of the electrochemical generator before charging the particular electrochemical cell to its respective maximum voltage, thereby ensuring that the sum of the voltages of the plurality of electrochemical cells does not exceed the preset voltage limit of the application load.

8. A method as defined in claim 1, wherein the predetermined voltage level divided by the number of electrochemical cells comprised in the electrochemical generator is comprised into a range of about 2.8 Volts to about 3.2 Volts.

9. An electrochemical generator comprising at least two electrochemical cells and an electronic control system, said electronic control system being operative to implement the method defined in claim 1.

* * * * *